United States Patent
Kanatani et al.

(10) Patent No.: US 11,521,030 B2
(45) Date of Patent: Dec. 6, 2022

(54) IMAGE FORMING DEVICE AND IMAGE FORMING METHOD FOR PRINTING COLORED PATTERN PARTS ON APPAREL CLOTH

(71) Applicant: KONICA MINOLTA, INC., Tokyo (JP)

(72) Inventors: Nobuaki Kanatani, Hino (JP); Toshihiko Yoshimura, Musashimurayama (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 17/341,531

(22) Filed: Jun. 8, 2021

(65) Prior Publication Data

US 2021/0390356 A1 Dec. 16, 2021

(30) Foreign Application Priority Data

Jun. 12, 2020 (JP) .............................. JP2020-102586

(51) Int. Cl.
  *G06K 15/02* (2006.01)
  *B41J 3/407* (2006.01)
(52) U.S. Cl.
  CPC ....... *G06K 15/1885* (2013.01); *G06K 15/021* (2013.01); *G06K 15/1843* (2013.01); *G06K 15/1889* (2013.01); *B41J 3/4078* (2013.01)

(58) Field of Classification Search
  CPC ................................................... G06K 15/1885
  USPC ................................................... 358/1.15, 1.2
  See application file for complete search history.

(56) References Cited

U.S. PATENT DOCUMENTS

| 9,623,578 B1* | 4/2017 | Aminpour | B26D 5/007 |
| 2004/0207875 A1* | 10/2004 | Endo | H04N 1/3875 |
|  |  |  | 358/1.18 |
| 2019/0100030 A1* | 4/2019 | Landau | B41J 3/4078 |
| 2020/0094579 A1* | 3/2020 | Dziesietnik | B41J 3/4078 |

FOREIGN PATENT DOCUMENTS

JP  2000336513 A  12/2000

* cited by examiner

*Primary Examiner* — Jacky X Zheng
(74) *Attorney, Agent, or Firm* — Buchanan Ingersoll & Rooney PC

(57) ABSTRACT

An image forming device comprising a processing section processing a provisionally combined datum into which a part image datum and a pattern datum included in marking data are merged, the part image datum being prepared by arranging picture pattern data into a shape of the picture pattern data for each of parts, the processing section including a margin setting section setting a margin on a periphery of the part and an image processing section arranging an image prepared based on the part image datum in an area of the margin.

20 Claims, 5 Drawing Sheets

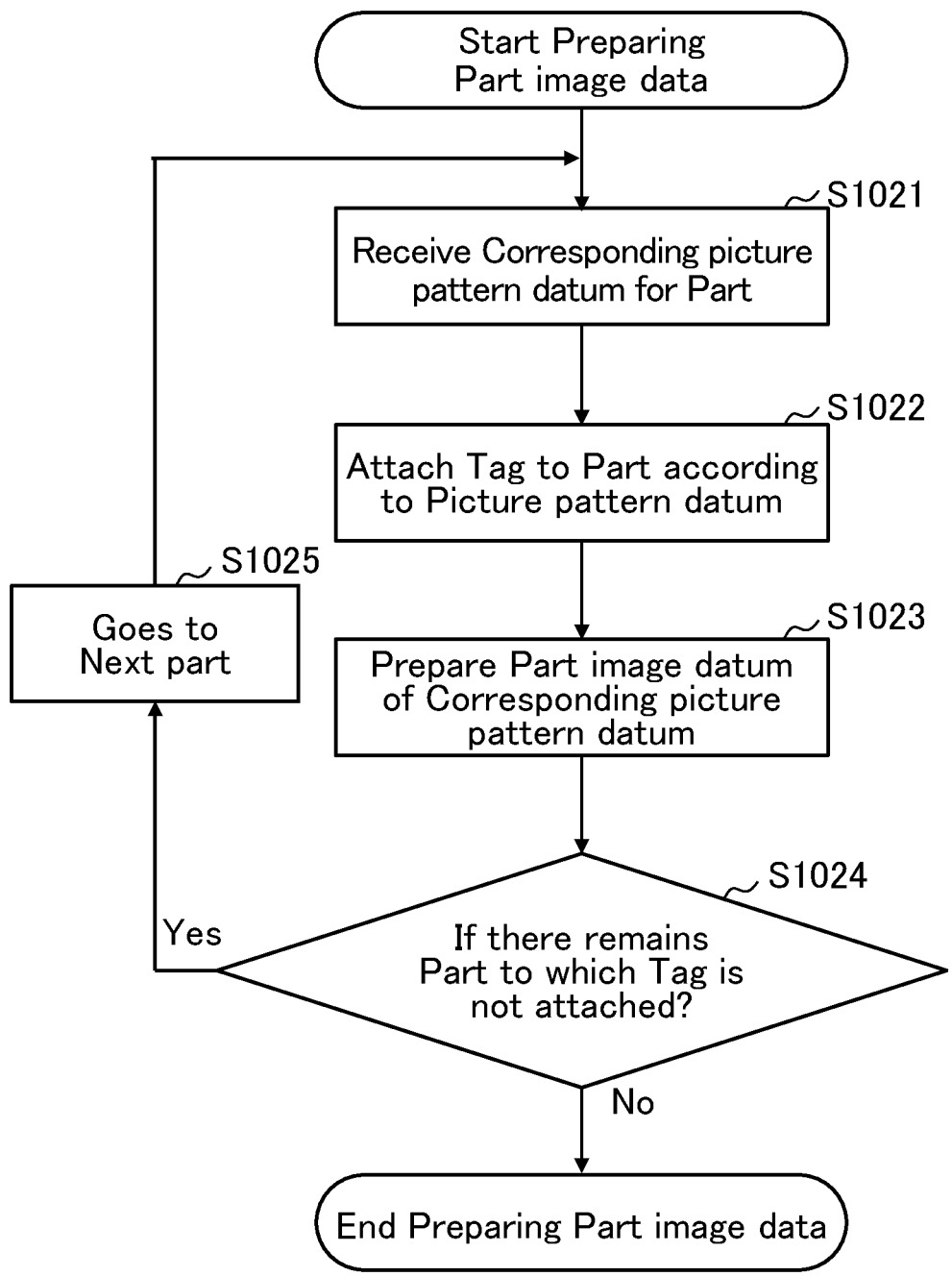

IMAGE FORMING DEVICE AND IMAGE FORMING METHOD FOR PRINTING COLORED PATTERN PARTS ON APPAREL CLOTH

CROSS REFERENCE TO RELATED APPLICATIONS

This application claims the foreign priority benefit under 35 U.S.C. § 119 of Japanese Patent Application No. 2020-102586 filed on Jun. 12, 2020, the disclosure of which is incorporated herein by reference.

TECHNICAL FIELD

The present invention relates to an image forming device, an image forming method and a storage medium storing a program for image forming.

BACKGROUND OF THE INVENTION

In a field of an apparel production, recent improvement of a printing technology has enabled sewing parts cut out from a cloth on which various colored pattern parts that are printed are formed, instead of sewing parts which are respectively cut out from different clothes, over each of which identical colored patterns are printed. For example, JP2000-336513A discloses a cloth cutting-out apparatus which dyes various patterned portions of a cloth respectively with designated colors and cuts out the patterned parts. This cloth cutting-out apparatus can reduce a loss of the cloth left after cutting-out.

However, if designated patterned parts printed respectively with designated colors are formed on a cloth as illustrated in JP2000-336513A, a portion of a product part that is not patterned and printed could be exposed due to a small position error on the cloth on which processing such as cutting-out or sewing is performed. That is, the technology as described in JP2000-336513A requires special positioning accuracy for the processing and this requirement could lower an operation speed. If an error is found on the cutting-out position, the cutting-out process has to be performed again and a lot of products with the same error need to be discarded. Accordingly, the operation speed and the production yield could lower.

SUMMARY

The present invention has been created to achieve the objective above described. That is, the present invention has an objective to provide an image forming device and an image forming method to improve a yield and operation efficiency of the garment production process after the image forming process, especially based on an image forming process in which a margin is added on a periphery of each part and picture patterns are arranged in each part and its margin, both of which are colored.

In order to achieve the objective above mentioned, the present invention has the following configurations.

(1) An image forming device comprising a processing section processing a provisionally combined datum into which a part image datum and a pattern datum included in marking data are merged, the part image datum being prepared by arranging picture pattern data into a shape of the picture pattern data for each of parts, the processing section including a margin setting section setting a margin on a periphery of the part and an image processing section arranging an image prepared based on the part image datum in an area of the margin.

(2) The image forming device according to (1), wherein the margin set by the margin setting section is in an arbitrary shape which a user is able to choose and encloses one of the parts or a plurality of the parts that is grouped.

(3) The image forming device according to (1), wherein the margin set by the margin setting section is in a predetermined shape and encloses one of the parts or a plurality of the parts that is grouped.

(4) The image forming device according to (2), wherein when the margin setting section groups the parts into part groups, the margin setting section groups the parts having part image data prepared based on identical picture pattern data.

(5) The image forming device according to (4), wherein the margin setting section groups the parts for a product.

(6) The image forming device according to (4), wherein the margin setting section groups an arbitrary number of the parts of a same kind.

(7) The image forming device according to (1), wherein the margin setting section sets the margin of which a shape is formed by enlarging the part included in the marking data by a predetermined magnification.

(8) The image forming device according to (1), wherein the margin setting section sets the margin of which a shape is formed by enlarging the part included in the marking data by an arbitrary magnification that a user is able to designate.

(9) The image forming device according to (8), wherein a user is able to designate the arbitrary magnifications that are used respectively for a longitudinal direction and a lateral direction and are different from each other.

(10) The image forming device according to (8), wherein a user is able to designate the arbitrary magnifications that are used respectively for a center portion and an edge portion and are different from each other.

(11) The image forming device according to (1), wherein the image processing section deforms the part image datum according to a shape of the margin

(12) The image forming device according to (1), wherein the image processing section copies an outer peripheral region of the part image data having a predetermined width and arranges the outer peripheral region on an area of the margin.

(13) The image forming device according to (1), wherein the image processing section repeatedly arranges a picture pattern included in the part image datum. In an area of the margin.

(14) The image forming device according to (1), further comprising a lay-out adjusting section adjusting the margins overlapping with each other.

(15) The image forming device according to (14), wherein if the margins of any two of the parts that are disposed adjacent to each other overlaps with each other, the lay-out adjusting section sets a border of the margins at a center of a gap between the parts.

(16) The image forming device according to (14), wherein each of the parts has a priority rank, and wherein if the margin of a first part of the parts overlaps with the margin of a second part of the parts that is located adjacent to the first part and has the priority rank higher than the first part, the margin of the second part is prioritized over the margin of the first part.

(17) The image forming device according to (14), further comprising a marking data preparing section preparing marking data, wherein if the margin of a first part of the parts overlaps with the margin of a second part of the parts that is located adjacent to the first part, the lay-out adjusting section displaces at least one of the first part and the second part so that the margins of the first and second parts do not overlap with each other, and the marking data preparing section prepares the corrected marking data based on the at least one of the first part and the second part having been displaced.

(18) The image forming device according to (1), wherein the processing section includes a processing reference information appending section appending processing reference information to the provisionally combined data.

(19) The image forming device according to (18), wherein the processing reference information appending section appends a border line to separate each of the parts used for a product.

(20) The image forming device according to (18), wherein the processing reference information appending section appends a processing reference line on a center of the part or at a predetermined position in the part.

(21) An image forming method comprising, a provisionally combined data processing step of processing a provisionally combined datum into which a part image datum and a pattern datum included in marking data are merged, the part image datum being prepared by arranging picture pattern data into a shape of the picture pattern data for each of parts and an image data preparing step of preparing an image datum from the processed provisionally combined datum, wherein the provisionally combined data processing step includes a step of processing the provisionally combined data so that a margin is set on a periphery of each of the parts and a step of processing the part image datum and arranging the part image datum in the margin.

(22) A storage medium storing a program for image forming, the program comprising a provisionally combined data processing step of processing a provisionally combined datum into which a part image datum and a pattern datum included in marking data are merged, the part image datum being prepared by arranging picture pattern data into a shape of the picture pattern data for each of parts and an image data preparing step of preparing an image datum from the processed provisionally combined datum, wherein the provisionally combined data processing step includes a step of processing the provisionally combined data so that a margin is set on a periphery of each of the parts and a step of processing the part image datum and arranging the part image datum in the margin.

The present invention enables improving improve a yield and operation efficiency of the garment production process after the image forming process especially by means of an image forming process in which a margin is added on a periphery of each part and picture patterns are arranged in each part and its margin, both of which are colored.

BRIEF DESCRIPTION OF THE DRAWINGS

FIG. 6 describes a flow chart of a process for forming part images for the modified example.

DETAILED DESCRIPTION OF EMBODIMENTS

Embodiments of the present invention are described with appropriate reference to the drawings. It should be noted that the scope of the present invention is limited to the following embodiments. A part of or all of elements constituting an embodiment may be appropriately combined with other elements for another embodiment.

Figure 1:
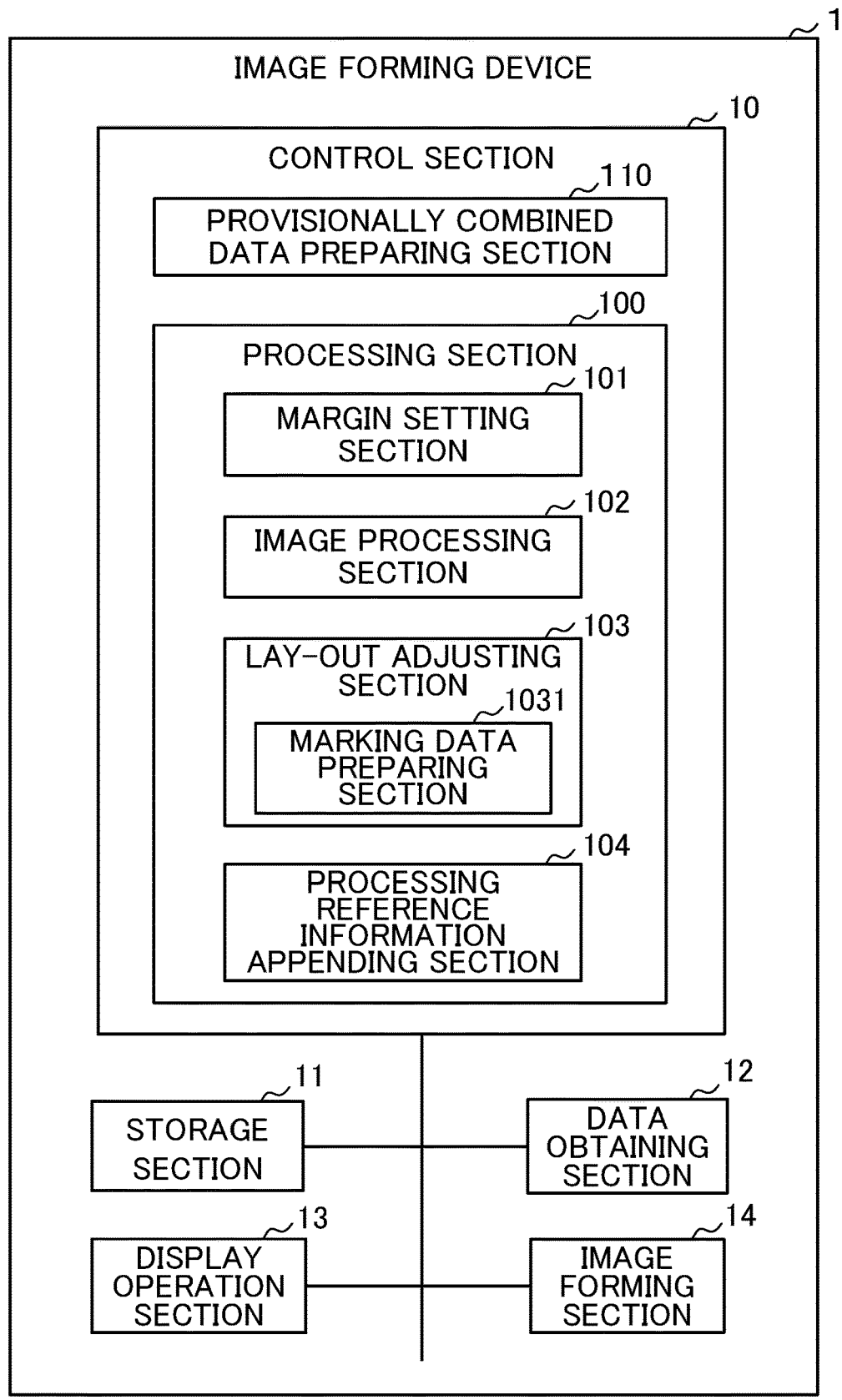
FIG. 1 shows schematically a total system configuration of an image forming device of an embodiment of the present invention.

An image forming device of an embodiment of the present invention is described. FIG. 1 shows schematically a total system of an image forming device 1 of the embodiment. The image forming device 1 includes a control section 10, a storage section 11, a data obtaining section 12, a displaying operation section 13 and an image forming section 14 and is configured to add a margin to each part in marking data and arrange picture pattern data in the margin as well to form an image.

A shape datum for a part pattern of a garment is referred to as a pattern datum and data in which several pattern data are arranged are referred to as marking data. Hereinafter, an individual pattern datum is also referred to as a "part". In addition, a "picture pattern datum" refers to a datum for a picture pattern or a color to be formed (oriented) on a raw material like a cloth for a garment. An "image" refers to a final image in which parts and their margins are laid out, and each of the parts and its margin have picture pattern data arranged therein.

The control section 10 is CPU (Central Processing Unit) or the like, includes a provisionally combined data preparing section 110 and a processing section 100, and is configured to control an operation of the image forming device 1. The provisionally combined data preparing section 110 is configured to prepare each of part image data by arranging predetermined picture pattern data into a shape of the predetermined picture pattern data for the corresponding part and prepare provisionally combined data by merging each of the pattern data included in the marking data with the corresponding pattern image datum. The image forming device 1 of this embodiment comprises the provisionally combined data preparing section 110 to prepare the provisionally combined data. However, the provisionally combined data may be obtained from an outside source.

The processing section 100 includes a margin setting section 101, an image processing section 102, a lay-out adjusting section 103, and a processing reference information appending section 104, and is configured to process the picture pattern data and the marking data based on the provisionally combined data and an image forming program that are stored in the storage section 11 in order to form an image.

The margin setting section 101 is configured to set a margin on the periphery of each of the parts included in the provisionally combined data. The image processing section 102 is configured to process the picture pattern data for the margin with a method that is suited for property of the picture pattern data and arrange the processed picture pattern data in the margin to form the image. The "processing" to be performed by the image processing section 102 includes conversion of the picture pattern data of vector data into image data.

The lay-out adjusting section 103 includes a marking data preparing section 1031 that adjusts the lay-out of the parts if the image that is formed has margins overlap each other. The marking data preparing section 1031 prepares adjusted marking data after parts are displaced for the lay-out adjustment.

The processing reference information appending section 104 appends to the image a piece of processing reference information such as border lines and processing reference information lines over a whole product such as a garment.

The storage section 11 includes non-volatile storage medium such as ROM (Read Only Memory) and HDD (Hard Disk Drive), and RAM (Random Access Memory). The storage section 11 stores various programs such as an image forming program (not shown), and the picture data and the marking data that are received by the data obtaining section 12. In addition, the storage section 11 functions as an operation area for the control section 10 executing a program.

The data obtaining section 12 receives the picture pattern data, the marking data and the like. These data may be received through a network (not shown) from an outside storage device (not shown) that is connected to the image forming device 1, or with another method.

The display operation section 13 includes, for example, a touch panel display to show an operation screen and at the same time receive inputs from a user. Alternatively, instead of the display operation section 13, a display section and an operation section that is separated from the display section may be used.

The image forming section 14 may be, for example, a printing device that can form on a raw material such as a cloth an image formed by the processing section 100.

Figure 2:
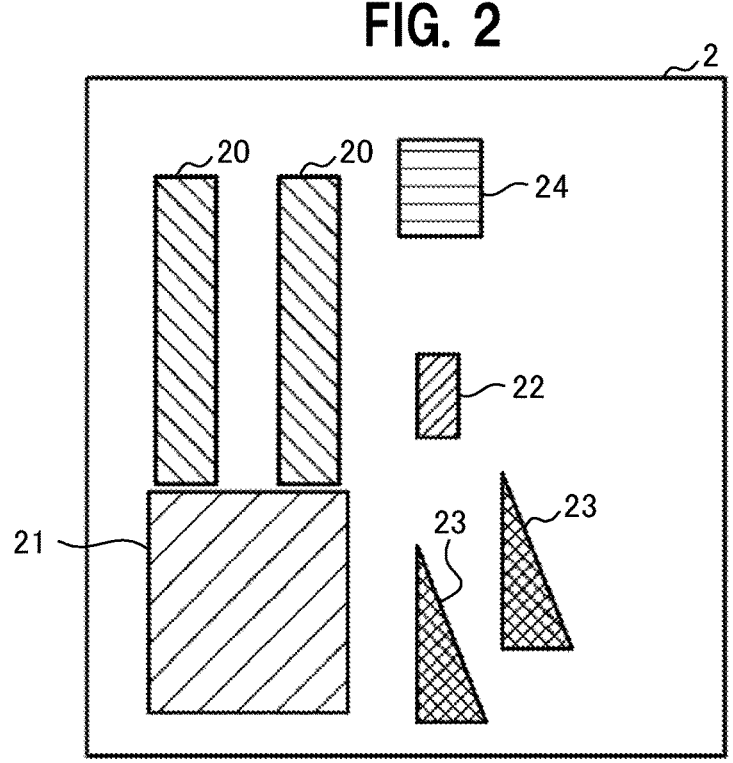
FIG. 2 shows schematically a part of a provisionally combined datum for the embodiment.

Next, the margin to be added on the periphery of the part is specifically explained. FIG. 2 schematically shows provisionally combined data 2 that are part of the provisionally combined data of the embodiment. The provisionally combined data 2 includes parts (lay-out data) 20, 21, 22, 23, 24. There is a part image datum arranged inside each of the parts 20, 21, 22, 23, 24. The part image datum for each of the parts 20, 21, 22, 23, 24 is prepared by arranging corresponding picture pattern data into a shape of the corresponding picture pattern data for the corresponding part of the parts 20, 21, 22, 23, 24.

Figure 3:
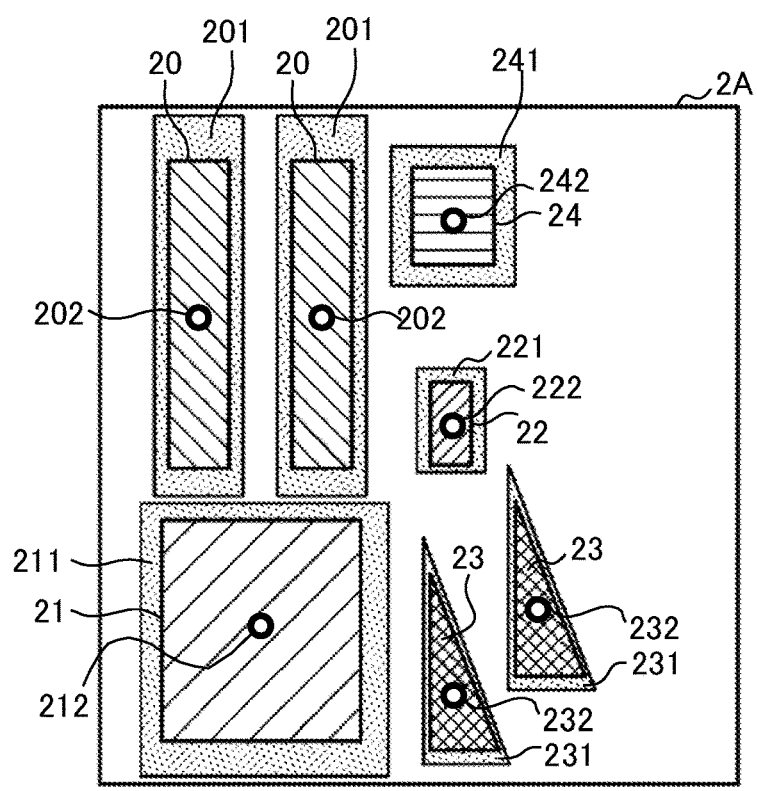
FIG. 3 shows a part of an image for the embodiment.

FIG. 3 shows an image 2A that is a part of the image created by the processing section 100. In the image 2A, margins 201, 211, 221, 231, 241 are sed respectively on the peripheries of the parts 20, 21, 22, 23, 24 of the provisionally combined data, and the part image data corresponding to the parts 20, 21, 22, 23, 24 are arranged respectively into the margins 201, 211, 221, 231, 241 after the part image data are processed. Pieces of the processing reference information 202, 212, 222, 232, 242 are added respectively to centers of the parts 20, 21, 22, 23, 24. The margins 201, 211, 221, 231, 241 may be respectively areas to which the parts 20, 21, 22, 23, 24 are enlarged respectively at arbitrary magnifications that a user should designates.

Since the margins 201, 211, 221, 231, 241 are set and the part image data are arranged respectively in the in margins 201, 211, 221, 231, 241, that is, the margins 201, 211, 221, 231, 241 are filled respectively with the picture patterns, a predetermined level of misalignment in the cutting and sewing processes after the image forming process can be tolerated. Tolerating a larger misalignment enables reducing lots of products to be reprocessed or abandoned due to the misalignments, which contributes to improving the yield of the products and the operation efficiency.

In this embodiment, the magnifications for the enlargement are designated by the user. However, the predetermined magnifications may be used. If the magnifications can be arbitrarily designated, the user can designate the magnifications according to the property of the cloth on which the image is formed or the property of the picture pattern. On the other hand, if a predetermined magnification is designated in advance, a user, who does not have expertise on garment production, can obtain the image without debating how large the margin should be.

The image 2A is a part of a whole image whose center exists at the left-upper side of the image 2A. In the image 2A, the magnification for the enlargement differs between the center portion of the whole image and the peripheral portion of the whole image. For example, the magnification on the margin 231 set on the part 23 that is located at the peripheral portion far from the center of the whole image is smaller than that on the margin 201 set on the part 20 that is located close to the center of the whole image.

The reason for using different magnifications between the center portion and the peripheral portion far from the center is as follows. The cloth on which the image is to be formed can have different stretch rates between the center portion and the peripheral portion far from the center. Therefore, the magnification on the margin at the peripheral portion far from the center should be set smaller because the margin at the peripheral portion has a larger stretch rate and can stretch more. On the other hand, the magnification on the margin at the center portion should be set larger because the margin at the center portion has a smaller stretch rate and can stretch less. Thus, the sizes of the margins in the image finally formed on the cloth can be appropriately determined, even if such a cloth whose stretch rate differs between its portions at different positions is used.

When the magnification on the margin is arbitrarily designated, it is also possible to designate different magnifications between the longitudinal direction and the lateral direction. The reason for designating the magnification in this way is as follows. For example, the cloth can have different stretch rates for the longitudinal direction and the lateral direction, depending how it is woven. In this case, the magnification should be set smaller for one direction for which the stretch rate is larger while the magnification should be set larger for the other direction for which the stretch rate is smaller. Thus, if the cloth has different stretch rates between directions, the sizes of the margins to be set on the image to be finally formed on the cloth can be determined appropriately.

The data prepared by processing the part image data for the parts 20, 21, 22, 23, 24 are arranged respectively into the margins 201, 211, 221, 231, 241. One method to process the part image may be to enlarge or deform the part image data, for example, according to a shape of the margin. This method enables deforming the part image without changing the area ratio of the picture patterns in the part if the magnification for the enlargement is constant over the image when the picture pattern data is a sheet of an illustration.

Another method to process the part image may be to copy an outer peripheral region on the part image for each of the parts 20, 21, 22, 23, 24 that has a predetermined width of, for example, one pixel and arrange this outer peripheral region in a corresponding one of the margins 201, 211, 221, 231, 241. This method enables reducing a distortion in the picture pattern, for instance, if such a part image as has a picture pattern whose peripheral region is fully drawn with a single color is processed. Especially, if the magnification for the enlargement of the margin is altered between directions or between portions located at different positions, the difference in the magnification advantageously does not bring about a distortion in the picture pattern.

Another method to process the part image may be to repeatedly arrange picture patterns included in the part image data for the parts 20, 21, 22, 23, 24 respectively in the margins 201, 211, 221, 231, 241. This method enables preventing the picture patterns from distorting due to the difference in the magnification for enlargement of the margin between directions or between portions at different positions, when arranging such patterns to be regularly repeated as dot patterns or houndstooth patterns. In addition, when arranging the patterns to be regularly repeated as described above, the patterns to be regularly repeated may be uniformly arranged in a whole area of each of the parts 20, 22, 22, 23, 24 combined respectively with the margins 201, 211, 221, 231, 241, instead of arranging the patterns to be regularly repeated in the parts 20, 22, 22, 23, 24 and separately arranging the patterns to be regularly repeated in the margins 201, 211, 221, 231, 241.

When the margin 201 is set on the part 20 in the provisionally combined data 2 as shown in FIG. 2, the margin 201 and the margin 211 overlap each other. Then, the lay-out adjustment is performed to displace the part 20 and the margin 201 upward in FIG. 3. As a result, the image 2A in FIG. 3 shows the margin 201 and the margin 211 that do not overlap each other. Thus, the lay-out adjustment enables setting the margins that are sufficiently large respectively on both the part 20 and the part 21. When the displacement as described is performed, it is preferable for the marking data preparing section 1031 to prepare modified marking data based on the lay-out after the displacement.

Each of the parts is assigned a piece of priority information on a priority rank, and when the lay-out adjustment is performed, the part with a higher priority rank and its margin may be prioritized over other parts and their margins without displacing any of the parts. A part being prioritized corresponds to, for example, a process to put a part with a higher priority rank along with its margin on a layer over a part with a lower priority rank and its margin. The process based on the priority rank enables easily adjusting the lay-out without a need to prepare the modified marking data necessitated by the displacement of a part. This method is suited for a case where there are parts with a lower priority rank as well as parts with a higher priority rank.

In addition, when the lay-out adjustment is performed, a border between a couple of the margins may be set at a center of a gap between the parts without moving any part. This process to set the border between the parts enables easily adjusting the lay-out without a need to prepare the modified marking data necessitated by the displacement of a part. This method is suited for a case where the size of the marking data is set sufficiently large.

The pieces of processing reference information 202, 212, 222, 232, 242 indicate respectively centers of the parts 20, 21, 22, 23, 24. Each piece of the processing reference information may include not only a center point but also, for example, any position information on an edge of a part designated by a user or border lines for a whole garment product.

Adding the pieces of the processing reference information as described above enables improving recognition of a processing position of a part on which a margin is arranged, which contributes to improving production efficiency.

Figure 4:
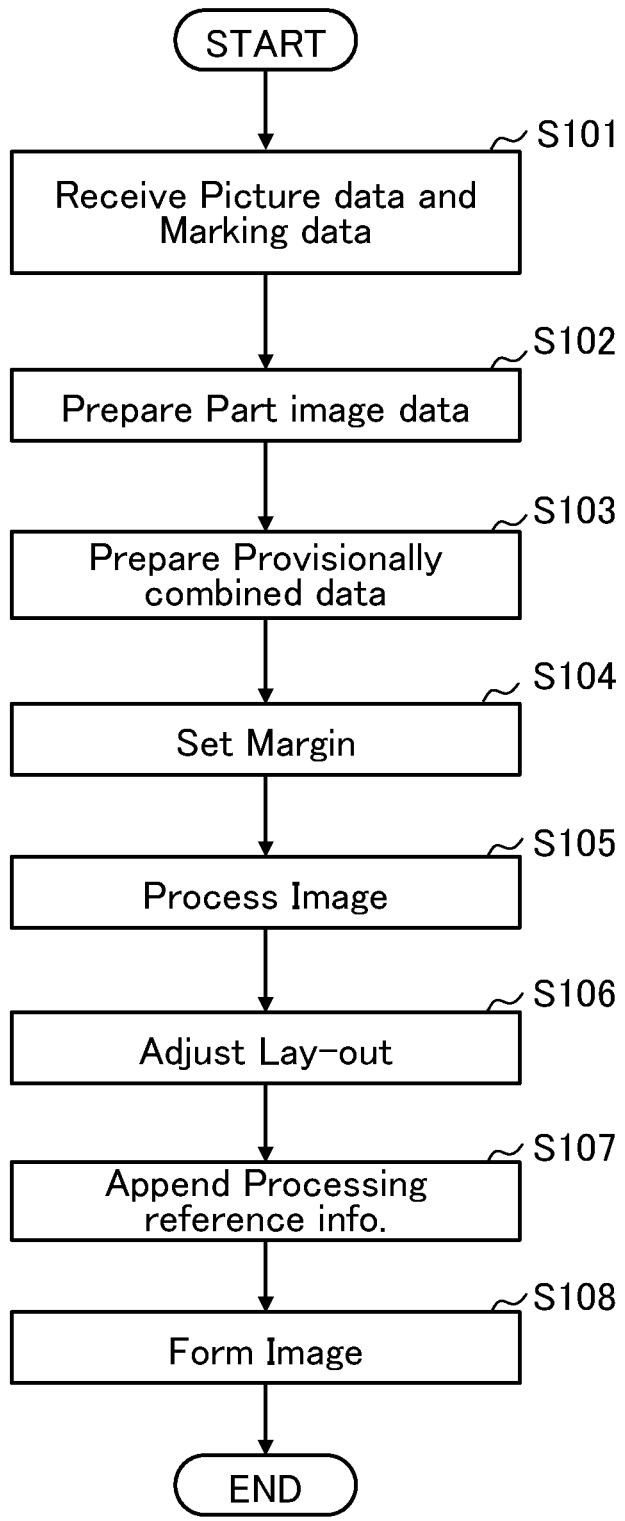
FIG. 4 describes a flow chart of an image forming process for the embodiment.

Next, how an image of the margin filled with picture pattern data is formed is explained. FIG. 4 describes a flow chart for the image forming process of the present embodiment.

In Step S101, the data obtaining section 12 receives a picture pattern datum and the marking data.

In Step S102, the provisionally combined data preparing section 110 prepares the part image data by arranging the picture pattern data into a shape of the picture pattern data for each of the lay-out data (parts).

In Step S103, the provisionally combined data preparing section 110 prepares the provisionally combined data 2 by combining the part image datum with each of the lay-out data in the marking data.

In Step S104, the margin setting section 101 sets the margins 201, 211, 221, 231, 241 respectively on the parts 20, 21, 22, 23, 24 included in the provisionally combined data 2.

In Step S105, the image processing section 102 processes the part image data respectively according to the shapes of the margins 201, 211, 221, 231, 241 to arrange the processed part image data respectively into the margins 201, 211, 221, 231, 241. In other words, the image 2A is formed by filling the margins 201, 211, 221, 231, 241 in the provisionally combined data respectively with the picture patterns.

In Step S106, the lay-out adjusting section 103 displaces the part 20 in the image 2A so that the margin 201 and the margin 211 do not overlap each other. When this operation is performed, the marking data preparing section 1031 prepares and outputs the corrected marking data including the data on the part 20 that has been displaced.

In Step S107, the processing reference information appending section 104 appends the pieces of the processing reference information 202~204 respectively on the parts 20~24 in the image 2A.

In Step S108, the image forming section 14 forms the image 2A on a raw material such as a cloth. The image forming device 1 performs the process as shown in FIG. 4 to set a margin on each of the parts and form the margin having picture patterns and being colored. As a result, the image forming device 1 can improve the yield and the operation efficiency in the processes after the image forming process.

Modified Example

Figure 5:
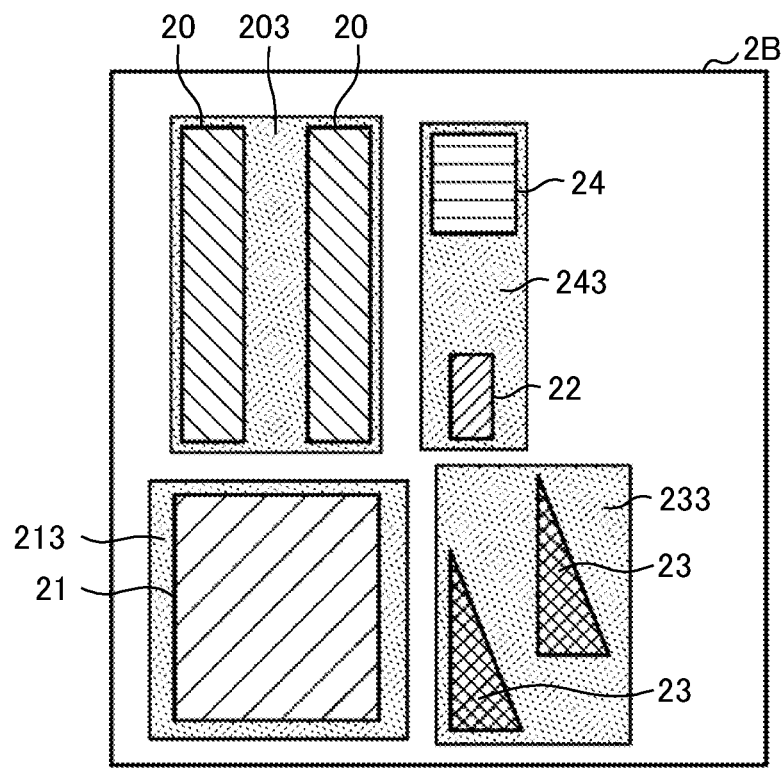
FIG. 5 shows a part of an image for a modified example of the embodiment.

A modified example of the embodiment of the present invention is explained below. This example includes the same items as the embodiment already explained. Accordingly, the same explanation on the items already explained is not repeated and only different items are explained. FIG. 5 shows an image 2B that is a part of a whole image that the processing section 100 prepares for this modified example. The image 2B differs from the image 2A in FIG. 3 in that grouping is performed on the parts 20, 21, 22, 23, 24 when the margins 203, 213, 223, 233, 243 are set on these parts.

The margins 203, 213, 233, 243 are rectangular areas and respectively enclose a couple of the parts 21, the part 21, a couple of the parts 23 and both of the part 22 and the part 24. The shape of the area may be not limited to the rectangular shape, may be a circular shape, a polygonal shape, or any other shape, and may be a predetermined shape or chosen arbitrarily by a user.

Grouping the parts into several part groups as described is performed preferably in such a way that each of the resultant part groups includes the parts having part images formed by identical picture pattern data. The grouping may be performed on all the parts required for a product. When the parts required for a product is grouped, the parts for a product are recognized at first sight, which enables improving operation efficiency in processes after the image forming process. When the parts are grouped, a predetermined or an arbitrary number of parts of the same kind may grouped. The parts of the same kind are, for example, parts for a sleeve or a hem, if the parts are for a garment. If the parts of the same kind are grouped, a user can recognize in which area the parts of a kind are located at first sight, which enables improving operation efficiency in processes after the image forming process.

The grouping process of this modified example is explained in detail. In this modified example, tags are attached to the parts according to the picture patterns and the grouping is performed based on the tags. FIG. 6 describes how the tags are attached. FIG. 6 describes a flow chart of a process corresponding to Step S102 in FIG. 4 in which the part image data are prepared.

In Step S1021, the provisionally combined data preparing section 110 receives a picture pattern datum (corresponding picture pattern datum) for a part.

In Step S1022, the provisionally combined data preparing section 110 attaches to the part a tag for the corresponding picture pattern datum.

In Step S1023, the provisionally combined data preparing section 110 arranges the corresponding picture pattern data into a shape of the corresponding picture pattern data for the part to which the tag is attached in order to form the part image.

In Step S1024, the provisionally combined data preparing section 110 determines if there remains a part to which a tag is not attached. If there is a part to which no tag is attached (Yes in Step S1024), the process goes to Step S1025 to prepare the part image for the part. If there remains no part to which a tag is not attached (No in Step S1024), the provisionally combined data preparing section 110 determines that the part images have been prepared for all the parts with tags being attached to all the parts and ends the process for preparing the part image data.

When the margin setting section 101 sets a margin, the margin setting section 101 checks the tags attached to parts and groups the parts to which identical tags are attached. If the grouping is performed according to the kind of the part or the parts for a whole product, the grouping can be performed the same way as described above by attaching the tags according to the kind of the part or the parts for the whole product.

The scope of the present invention should not be limited to the embodiment and its modified example. The present invention can be modified within the scope of the present invention.

What is claimed is:

1. An image forming device comprising a processor for processing a provisionally combined datum into which a part image datum and a pattern datum included in marking data are merged, the part image datum being prepared by arranging picture pattern data into a shape of the picture pattern data for each of parts,
   the processor being configured to:
   set a margin on a periphery of the part, wherein the margin is formed by enlarging the part included in the marking data by arbitrary magnifications that a user is able to designate respectively for a longitudinal direction and a lateral direction and are different from each other; and
   arrange an image prepared based on the part image datum in an area of the margin.

2. The image forming device as claimed in claim 1, wherein the margin set by the processor is in an arbitrary shape which a user is able to choose and encloses one of the parts or a plurality of the parts that are grouped.

3. The image forming device as claimed in claim 2, wherein when the processor groups the parts into part groups, and groups the parts having part image data prepared based on identical picture pattern data.

4. The image forming device as claimed in claim 3, wherein the processor groups the parts used for a product.

5. The image forming device as claimed in claim 3, wherein the processor groups an arbitrary number of the parts of a same kind.

6. The image forming device as claimed in claim 1, wherein the margin set by the processor is in a predetermined shape and encloses one of the parts or a plurality of the parts that are grouped.

7. The image forming device as claimed in claim 1, wherein the processor sets the margin of which a shape is formed by enlarging the part included in the marking data by a predetermined magnification.

8. The image forming device as claimed in claim 1, wherein a user is able to designate the arbitrary magnifications that are used respectively for a center portion and an edge portion and are different from each other.

9. The image forming device as claimed in claim 1, wherein the processor deforms the part image datum according to a shape of the margin.

10. The image forming device as claimed in claim 1, wherein the processor copies an outer peripheral region of the part image data having a predetermined width and arranges the outer peripheral region in an area of the margin.

11. The image forming device as claimed in claim 1, wherein the processor repeatedly arranges a picture pattern included in the part image datum in an area of the margin.

12. The image forming device as claimed in claim 1, wherein the processor further adjusts the margins overlapping with each other.

13. The image forming device as claimed in claim 12, wherein if the margins of any two of the parts that are disposed adjacent to each other overlap with each other, the processor sets a border of the margins at a center of a gap between the parts.

14. The image forming device as claimed in claim 12, wherein each of the parts has a priority rank, and wherein if the margin of a first part of the parts overlaps with the margin of a second part of the parts that is located adjacent to the first part and has the priority rank higher than the first part, the margin of the second part is prioritized over the margin of the first part.

15. The image forming device as claimed in claim 12, wherein the processor further prepares marking data, wherein if the margin of a first part of the parts overlaps with the margin of a second part of the parts that is located adjacent to the first part, the processor displaces at least one of the first part and the second part so that the margins of the first and second parts do not overlap with each other and prepares corrected marking data based on the at least one of the first part and the second part having been displaced.

16. The image forming device as claimed in claim 1, wherein the processor appends processing reference information to the provisionally combined data.

17. The image forming device as claimed in claim 16, wherein the processor appends a border line to separate each of the parts used for a product.

18. The image forming device as claimed in claim 16, wherein the processor appends a processing reference line on a center of the part or at a predetermined position in the part.

19. An image forming method carried out by means of a processor, the method comprising:
   merging a part image datum and a pattern datum included in marking data to obtain a provisionally combined datum, the part image datum being prepared by arranging picture pattern data into a shape of the picture pattern data for each of parts; and preparing an image datum from the provisionally combined datum, wherein obtaining the provisionally combined data includes;

processing the provisionally combined data so that a margin is set on a periphery of each of the parts, wherein the margin is formed by enlarging the part included in the marking data by arbitrary magnifications that a user is able to designate respectively for a longitudinal direction and a lateral direction and are different from each other; and processing the part image datum and arranging the part image datum in the margin.

20. A non-transitory storage medium storing a program for image forming which, when executed, causes a processor to:

process a provisionally combined datum into which a part image datum and a pattern datum included in marking data are merged, the part image datum being prepared by arranging picture pattern data into a shape of the picture pattern data for each of parts; and prepare an image datum from the processed provisionally combined datum, wherein the processing of the provisionally combined data includes;

processing the provisionally combined data so that a margin is set on a periphery of each of the parts, wherein the margin is formed by enlarging the part included in the marking data by arbitrary magnifications that a user is able to designate respectively for a longitudinal direction and a lateral direction and are different from each other; and processing the part image datum and arranging the part image datum in the margin.

\* \* \* \* \*